(12) United States Patent
Barton et al.

(10) Patent No.: US 7,980,062 B2
(45) Date of Patent: Jul. 19, 2011

(54) COLD START WHITE SMOKE AFTERTREATMENT PROTECTION

(75) Inventors: Jason Thomas Barton, Canton, MI (US); Matthew Thomas Baird, Canton, MI (US)

(73) Assignee: Detroit Diesel Corporation, Detroit, MI (US)

( * ) Notice: Subject to any disclaimer, the term of this patent is extended or adjusted under 35 U.S.C. 154(b) by 1068 days.

(21) Appl. No.: 11/818,817

(22) Filed: Jun. 15, 2007

(65) Prior Publication Data

US 2008/0307771 A1 Dec. 18, 2008

(51) Int. Cl.
*F01N 3/00* (2006.01)
*F01N 3/02* (2006.01)

(52) U.S. Cl. .............. 60/284; 60/274; 60/285; 60/297; 60/311

(58) Field of Classification Search .............. 60/273, 60/284, 285, 297, 311, 274, 295
See application file for complete search history.

(56) References Cited

U.S. PATENT DOCUMENTS

| | | | |
|---|---|---|---|
| 5,014,509 A | 5/1991 | Broering et al. | |
| 5,890,467 A | 4/1999 | Romzek | |
| 6,092,496 A | 7/2000 | Bhargava et al. | |
| 6,192,868 B1 | 2/2001 | Barnes et al. | |
| 6,523,525 B1 | 2/2003 | Hawkins | |
| 6,892,705 B2 | 5/2005 | Grau et al. | |
| 6,915,776 B2 | 7/2005 | zur Loye et al. | |
| 6,951,192 B2 | 10/2005 | Atschreiter et al. | |
| 7,178,491 B2 | 2/2007 | Chang | |
| 7,201,127 B2 | 4/2007 | Rockwell et al. | |
| 7,201,138 B2 | 4/2007 | Yamaguchi et al. | |
| 2002/0066422 A1 | 6/2002 | Hawkins et al. | |
| 2002/0081238 A1* | 6/2002 | Duvinage et al. | 422/168 |
| 2004/0055280 A1* | 3/2004 | Nishizawa et al. | 60/277 |
| 2004/0250535 A1* | 12/2004 | Miura | 60/285 |
| 2006/0218897 A1 | 10/2006 | Sisken et al. | |
| 2007/0056554 A1 | 3/2007 | Li et al. | |
| 2007/0199312 A1* | 8/2007 | Kapparos et al. | 60/297 |

FOREIGN PATENT DOCUMENTS

| | | | |
|---|---|---|---|
| JP | 61164019 A | * | 7/1986 |
| JP | 2004132181 A | * | 4/2004 |

OTHER PUBLICATIONS

Kamioka et al., English Abstract of JP 2004-132181 A, Apr. 30, 2004.*
Kurita et al., English Abstract of JP 61-164019 A, Jul. 24, 1986.*

* cited by examiner

*Primary Examiner* — Thomas E Denion
*Assistant Examiner* — Audrey Klasterka
(74) *Attorney, Agent, or Firm* — Bill C. Panagos; Rader, Fishman & Grauer PLLC

(57) ABSTRACT

A method for cold start white smoke protection of a hydrocarbon after treatment device, and method of engine operation to effect the same. The method comprises a) determining the temperature of the hydrocarbon after-treatment device during cold start conditions; b) determining hydrocarbon emissions in the hydrocarbon after-treatment device; and c) modifying engine operating conditions to raise the hydrocarbon after-treatment temperature at a pre-determined rate to a temperature sufficient to permit controlled oxidation of the hydrocarbons in the hydrocarbon after treatment device.

11 Claims, 2 Drawing Sheets

COLD START WHITE SMOKE AFTERTREATMENT PROTECTION

BACKGROUND OF THE INVENTION

1. Field of the Invention

The present invention relates to a method to control hydrocarbon after treatment device temperature for an electronic control heavy duty compression ignition engine having an Electronic Control Module (ECM) during cold start conditions.

The present invention further relates to a method of modifying engine operating conditions during cold start conditions to raise after treatment temperature at a pre-determined rate to a temperature sufficient to permit controlled oxidation of said hydrocarbons in said after treatment device.

The present invention further relates to a method to operate an electronically controlled heavy duty diesel engine during cold start conditions to burn excess hydrocarbons from a diesel particulate filter in a controlled manner to prevent damage to the after treatment system.

2. Detailed Description of the Related Art.

Li et al., U.S. Patent Pub. No. 2007/0056554, discloses a method of reducing nitrogen oxides and particulate matter in compression ignition engine emissions. The method includes monitoring at least one engine sensor that generates a signal and response to at least one engine operating condition and adjusting at least one engine control parameter in response to the signal in such that in cylinder spatial distribution of equivalence ratio and temperature is substantially maintained to an operating region. The operating region corresponds to a set of equivalence ratios with respect to temperature values that are substantially outside regions supportive of NOx and particulate matter formation. The temperature valves are lower than 1,650 degrees Kelvin and the equivalent ratios are greater than about 0.5.

Sisken et al., U.S. Patent Pub. No. 2006/0218897, discloses a method, system and controller for increasing exhaust gas temperatures through controlled operation of a radiator fan in order to facilitate regeneration and particulate of a particulate filter. The method system and controller are applicable in systems having an engine which emits exhaust gases having particulates which are captured by a particulate filter.

Grau et al., U.S. Pat. No. 6,892,705, discloses a method for operating an internal combustion engine which includes using the injection pressure to control combustion in the engine to minimize exhaust gas emissions during a cold start or during a warm up phase.

Hawkins et al., U.S. Pat. No. 6,523,525, discloses an engine control system and method of controlling an internal combustion engine having mandatory engine warm up. The engine control system includes an ECM having a torque inhibit circuit and a speed inhibit circuit and at least one engine fluid temperature sensor in communication with the electrical communication with the torque inhibit circuit and the speed inhibit circuit of the ECM. The sensor is exposed to at least one engine fluid and is adapted to provide an inhibit signal to the torque inhibit circuit and to the speed inhibit circuit indicative of the temperature of the fluid within the engine. Torque inhibit circuit and speed inhibit circuit are operable to cause the ECM to disregard any requests from an operator commanding an increase in engine torque or engine speed until such times inhibit signals from the temperature sensors exceed a predetermined threshold.

Bhargava et al., U.S. Pat. No. 6,092,496, discloses a method of operating a diesel engine that includes sensing the temperature level associated with the engine. The method includes positioning an intake valve in an open position during the exhaust stroke of the engine if the temperature is below a predetermined threshold so that heated exhaust gases advance into the intake conduit during the exhaust stroke so as to heat the intake air located in the intake conduit prior to the intake air advancing into the combustion chamber. The method further includes the step of positioning an intake valve in a closed position during the exhaust stroke if the temperature level is above the predetermined threshold value so that the heated exhaust gases are prevented from advancing into the intake conduit during the exhaust stroke.

SUMMARY OF THE INVENTION

It has been known that cold start conditions produces excess hydrocarbon emissions that are trapped in the hydrocarbon after-treatment device. Once the engine warms up, the exhaust gas temperature is warmed up and uncontrolled oxidation can occur in the hydrocarbon after-treatment device, resulting in damage to the after treatment device. The present invention is directed to a method for controlling the oxidation rate of excess hydrocarbons in a hydrocarbon after-treatment device to prevent damage to the hydrocarbon after-treatment device.

In one embodiment, the present invention is a method to control hydrocarbon after-treatment device temperature for an electronic control heavy duty compression ignition engine having an Electronic Control Module (ECM) during cold start conditions. It is contemplated that a cold start condition is detected by measuring engine starting time, engine temperature, engine speed, fuel delivery, valve timing, or radiator fluid temperature. The method comprises a) sensing the temperature of the hydrocarbon after-treatment device during cold start conditions; b) sensing hydrocarbon emissions in the hydrocarbon after-treatment device; and c) modifying engine operating conditions to raise the hydrocarbon after-treatment temperature at a predetermined rate to a temperature sufficient to permit controlled oxidation of the hydrocarbons in the hydrocarbon after treatment device. The ECM modifies engine operation by controlling at least one of engine speed, fuel injection timing, fuel injection pressure, exhaust gas recirculation; air intake throttle, exhaust throttle; turbocharger operation, valve timing, intake air heater and engine raking to raise exhaust temperature at a controlled rate to oxidize hydrocarbons in the hydrocarbon after-treatment device during cold start conditions. It is contemplated that the turbocharger is a Variable Geometry Turbocharger (VGT) a wastegate turbo charger; a sequential turbo charger; or a staged turbo charger. The hydrocarbon after treatment device is preferably a diesel particulate filter (DPF). After the hydrocarbon level in the hydrocarbon after-treatment device is reduced by controlled oxidation to a safe level, the engine is returned to a normal operating level.

The invention as described above may be better understood upon a reading of the following specification and drawings.

DETAILED DESCRIPTION OF A PREFERRED EMBODIMENT

Figure 1:
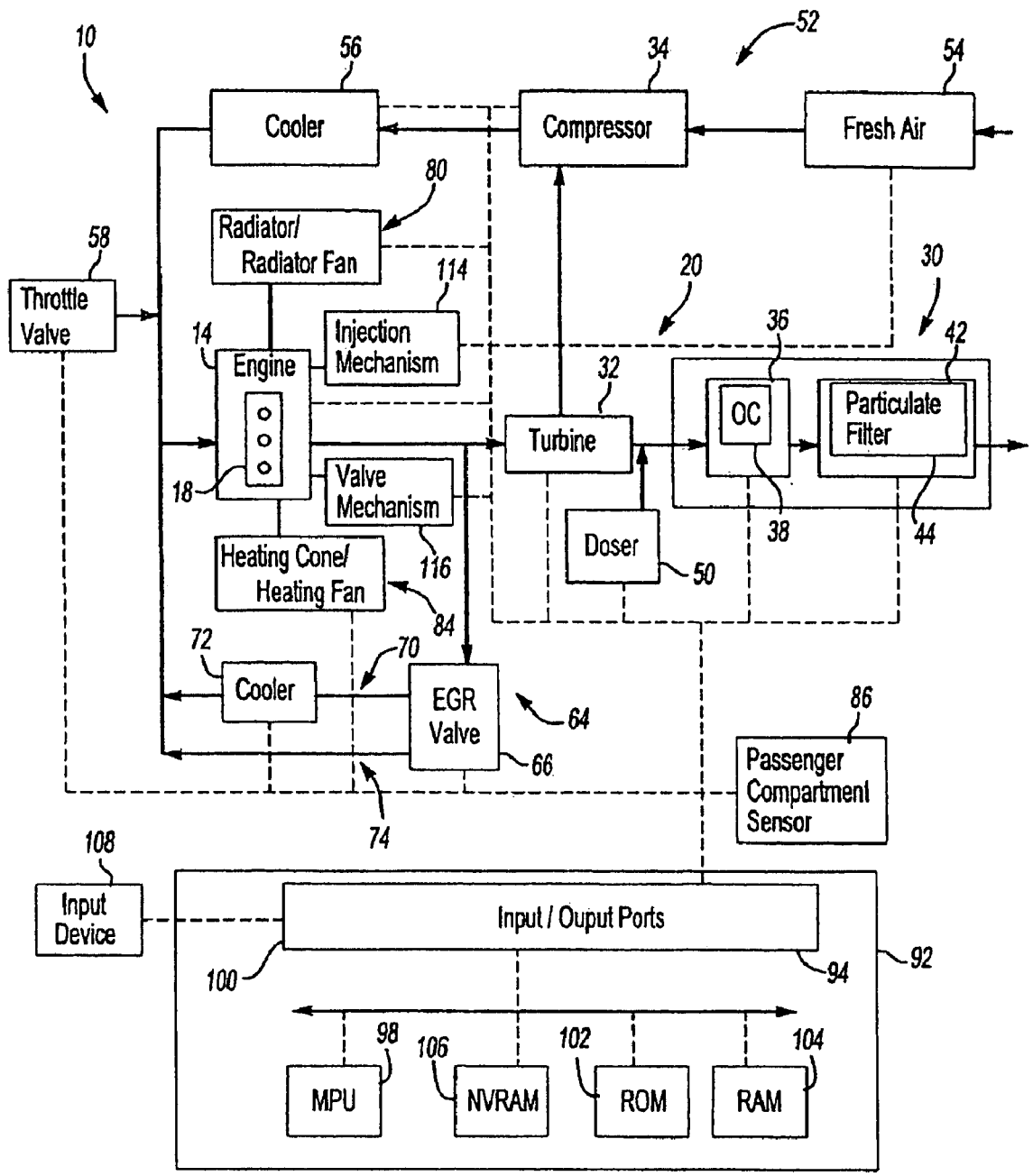
FIG. 1 is a schematic representation of a heavy duty internal combustion compression engine with a hydrocarbon after-treatment device.

FIG. 1 illustrates a vehicle powertrain system 10 in accordance with one non-limiting aspect of the present invention. The system 10 may provide power for driving any number of vehicles, including on-highway trucks, construction equipment, marine vessels, stationary generators, automobiles, trucks, tractor-trailers, boats, recreational vehicle, light and heavy-duty work vehicles, and the like.

The system 10 may be referred to as an internal combustion driven system wherein fuels, such as gasoline and diesel fuels, are burned in a combustion process to provide power, such as with a spark or compression ignition engine 14. The engine 14 may be a diesel engine that includes a number of cylinders 18 into which fuel and air are injected for ignition as one skilled in the art will appreciate. The engine 14 may be a multi-cylinder compression ignition internal combustion engine, such as a 4, 6, 8, 12, 16, or 24 cylinder diesel engines, for example. It should be noted, however, that the present invention is not limited to a particular type of engine or fuel.

Exhaust gases generated by the engine 14 during combustion may be emitted through an exhaust system 20. The exhaust system 20 may include any number of features, including an exhaust manifold and passageways to deliver the emitted exhaust gases to a particulate filter assembly 30, which in the case of diesel engines is commonly referred to as a diesel particulate filter. Optionally, the system 20 may include a turbocharger proximate the exhaust manifold for compressing fresh air delivery into the engine 14. The turbocharger, for example, may include a turbine 32 and a compressor 34, such as a variable geometry turbocharger (VGT) sequential turbocharger, waste gate and/or a turbo-compound power turbine. Of course, the present invention is not limited to exhaust systems having turbochargers or the like.

The particulate filter assembly 30 may be configured to capture particulates associated with the combustion process. In more detail, the particulate filter assembly 30 may include an oxidation catalyst (OC) canister 36, which in includes an OC 38, and a particulate filter canister 42, which includes a particulate filter 44. The canisters 36, 42 may be separate components joined together with a clamp or other feature such that the canisters 36, 42 may be separated for servicing and other operations. Of course, the present invention is not intended to be limited to this exemplary configuration for the particulate filter assembly 30. Rather, the present invention contemplates the particulate filter assembly including more or less of these components and features. In particular, the present invention contemplates the particulate filter assembly 30 including only the particulate filter 44 and not necessarily the OC canister 36 or substrate 38 and that the particulate filter 44 may be located in other portions of the exhaust system 20, such as upstream of the turbine 32.

The OC 38, which for diesel engines is commonly referred to as a diesel oxidation catalyst, may oxidize hydrocarbons and carbon monoxide included within the exhaust gases so as to increase temperatures at the particulate filter 44. The particulate filter 44 may capture particulates included within the exhaust gases, such as carbon, oil particles, ash, and the like, and regenerate the captured particulates if temperatures associated therewith are sufficiently high. In accordance with one non-limiting aspect of the present invention, one object of the particulate filter assembly 30 is to capture harmful carbonaceous particles included in the exhaust gases and to store these contaminates until temperatures at the particulate filter 44 favor oxidation of the captured particulates into a gas that can be discharged to the atmosphere.

The OC and particulate filter canisters 36, 42 may include inlets and outlets having defined cross-sectional areas with expansive portions therebetween to store the OC 38 and particulate filter 44, respectively. However, the present invention contemplates that the canisters 36, 42 and devices therein may include any number configurations and arrangements for oxidizing emissions and capturing particulates. As such, the present invention is not intended to be limited to any particular configuration for the particulate filter assembly 30.

To facilitate oxidizing the capture particulates, a doser 50 may be included to introduce fuel to the exhaust gases such that the fuel reacts with the OC 38 and combusts to increase temperatures at the particulate filter 44, such as to facilitate regeneration. For example, one non-limiting aspect of the present invention contemplates controlling the amount of fuel injected from the doser as a function of temperatures at the particulate filter 44 and other system parameters, such as air mass flow, EGR temperatures, and the like, so as to control regeneration. However, the present invention also contemplates that fuel may be included within the exhaust gases through other measures, such as by controlling the engine 14 to emit fuel with the exhaust gases.

An air intake system 52 may be included for delivering fresh air from a fresh air inlet 54 through an air passage to an intake manifold for introduction to the engine 14. In addition, the system 52 may include an air cooler or charge air cooler 56 to cool the fresh air after it is compressed by the compressor 34. Optionally, a throttle intake valve 58 may be provided to control the flow of fresh air to the engine 14. The throttle valve 58 may be a manually or electrically operated valve, such as one which is responsive to a pedal position of a throttle pedal operated by a driver of the vehicle. There are many variations possible for such an air intake system and the present invention is not intended to be limited to any particular arrangement. Rather, the present invention contemplates any number of features and devices for providing fresh air to the intake manifold and cylinders, including more or less of the foregoing features.

An exhaust gas recirculation (EGR) system 64 may be optionally provided to recycle exhaust gas to the engine 14 for mixture with the fresh air. The EGR system 64 may selectively introduce a metered portion of the exhaust gasses into the engine 14. The EGR system 64, for example, may dilute the incoming fuel charge and lower peak combustion temperatures to reduce the amount of oxides of nitrogen produced during combustion. The amount of exhaust gas to be recirculated may be controlled by controlling an EGR valve 66 and/or in combination with other features, such as the turbocharger. The EGR valve 66 may be a variable flow valve that is electronically controlled. There are many possible configurations for the controllable EGR valve 66 and embodiments of the present invention are not limited to any particular structure for the EGR valve 66.

The EGR system 64 in one non-limiting aspect of the present invention may include an EGR cooler passage 70, which includes an air cooler 72, and an EGR non-cooler bypass 74. The EGR value 66 may be provided at the exhaust manifold to meter exhaust gas through one or both of the EGR cooler passage 70 and bypass 74. Of course, the present invention contemplates that the EGR system 64 may include more or less of these features and other features for recycling exhaust gas. Accordingly, the present invention is not intended to be limited to any one EGR system and contemplates the use of other such systems, including more or less of these features, such as an EGR system having only one of the EGR cooler passage or bypass.

A cooling system 80 may be included for cycling the engine 14 by cycling coolant therethrough. The coolant may be sufficient for fluidly conducting away heat generated by the engine 14, such as through a radiator. The radiator may include a number of fins through which the coolant flows to be cooled by air flow through an engine housing and/or generated by a radiator fan directed thereto as one skilled in the art will appreciate. It is contemplated, however, that the present invention may include more or less of these features in the cooling system 80 and the present invention is not intended to be limited to the exemplary cooling system described above.

The cooling system 80 invention may operate in conjunction with a heating system 84. The heating system 84 may include a heating cone, a heating fan, and a heater valve. The heating cone may receive heated coolant fluid from the engine 14 through the heater valve so that the heating fan, which may be electrically controllable by occupants in a passenger area or cab of a vehicle, may blow air warmed by the heating cone to the passengers. For example, the heating fan may be controllable at various speeds to control an amount of warmed air blown past the heating cone whereby the warmed air may then be distributed through a venting system to the occupants. Optionally, sensors and switches 86 may be included in the passenger area to control the heating demands of the occupants. The switches and sensors may include dial or digital switches for requesting heating and sensors for determining whether the requested heating demand was met. The present invention contemplates that more or less of these features may be included in the heating system and is not intended to be limited to the exemplary heating system described above.

A controller 92, such as an electronic control module or engine control module, may be included in the system 10 to control various operations of the engine 14 and other system or subsystems associated therewith, such as the sensors in the exhaust, EGR, and intake systems. Various sensors may be in electrical communication with the controller via input/output ports 94. The controller 92 may include a microprocessor unit (MPU) 98 in communication with various computer readable storage media via a data and control bus 100. The computer readable storage media may include any of a number of known devices which function as read only memory 102, random access memory 104, and non-volatile random access memory 106. A data, diagnostics, and programming input and output device 108 may also be selectively connected to the controller via a plug to exchange various information therebetween. The device 108 may be used to change values within the computer readable storage media, such as configuration settings, calibration variables, instructions for EGR, intake, and exhaust systems control and others.

The system 10 may include an injection mechanism 114 for controlling fuel and/or air injection for the cylinders 18. The injection mechanism 114 may be controlled by the controller 92 or other controller and comprise any number of features, including features for injecting fuel and/or air into a common-rail cylinder intake and a unit that injects fuel and/or air into each cylinder individually. For example, the injection mechanism 114 may separately and independently control the fuel and/or air injected into each cylinder such that each cylinder may be separately and independently controlled to receive varying amounts of fuel and/or air or no fuel and/or air at all. Of course, the present invention contemplates that the injection mechanism 114 may include more or less of these features and is not intended to be limited to the features described above.

The system 10 may include a valve mechanism 116 for controlling valve timing of the cylinders 18, such as to control air flow into and exhaust flow out of the cylinders 18. The valve mechanism 116 may be controlled by the controller 92 or other controller and comprise any number of features, including features for selectively and independently opening and closing cylinder intake and/or exhaust valves. For example, the valve mechanism 116 may independently control the exhaust valve timing of each cylinder such that the exhaust and/or intake valves may be independently opened and closed at controllable intervals, such as with a compression brake. Of course, the present invention contemplates that the valve mechanism may include more or less of these features and is not intended to be limited to the features described above.

In operation, the controller 92 receives signals from various engine/vehicle sensors and executes control logic embedded in hardware and/or software to control the system 10. The computer readable storage media may, for example, include instructions stored thereon that are executable by the controller 92 to perform methods of controlling all features and sub-systems in the system 10. The program instructions may be executed by the controller in the MPU 98 to control the various systems and subsystems of the engine and/or vehicle through the input/output ports 94. In general, the dashed lines shown in FIG. 1 illustrate the optional sensing and control communication between the controller and the various components in the power train system. Furthermore, it is appreciated that any number of sensors and features may be associated with each feature in the system for monitoring and controlling the operation thereof.

In one non-limiting aspect of the present invention, the controller 92 may be the DDEC controller available from Detroit Diesel Corporation, Detroit, Mich. Various other features of this controller are described in detail in a number of U.S. patents assigned to Detroit Diesel Corporation. Further, the controller may include any of a number of programming and processing techniques or strategies to control any feature in the system 10. Moreover, the present invention contemplates that the system may include more than one controller, such as separate controllers for controlling system or subsystems, including an exhaust system controller to control exhaust gas temperatures, mass flow rates, and other features associated therewith. In addition, these controllers may include other controllers besides the DDEC controller described above.

In accordance with one non-limiting aspect of the present invention, the controller 92 or other feature, such as regeneration system controller, may be configured for determining a desired exhaust gas temperature for the exhaust gases emitted from the engine to facilitate regeneration of the particulate filter whereby particulates captured by the particulate filter are oxidized or otherwise burned. The disposal of the particulates in this manner may be advantageous to prevent clogging and filling of the particulate filter so that the exhaust gases may pass there through with minimal restriction and yet permit additional particulates to be collected.

The desired exhaust gas temperature may be calculated to correspond with other factors and influences on the regeneration process. For the purposes of the present invention, the desired exhaust gas temperature is intended to refer to the temperature of exhaust gases emitted from the engine that may be used alone or in combination with other control features to facilitate regeneration, such as in combination with the temperature influence of the doser 50 if the system includes such a feature.

One non-limiting aspect of the present invention relates to controlling the engine 14 to emit exhaust gases at the desired exhaust gas temperature to facilitate regeneration. The control thereof may be instigated according to software included on the controller 92 or inputted thereto. Similarly, however, the control may be executed with other logic and other controllers, such as a regeneration system controller or the like.

In accordance with one non-limiting aspect of the present invention, the desired exhaust temperatures may be determined to correspond with exhaust gas temperatures that are greater than exhaust gas temperatures currently being produced by the engine. For example, the vehicle may be idling or in other relatively low engine load conditions whereby the load on the engine 14 is insufficient to generate exhaust gas temperatures at temperatures high enough to facilitate regeneration of the particulate filter 44. The present invention contemplates this problem and proposes increasing the load on the engine 14 so as to increase the exhaust gas temperature of the exhaust gases emitted therefrom. The increased load may be determined as a function of the desired exhaust gas temperature and the current exhaust gas temperature (which is less that the desired exhaust gas temperature).

Figure 2:
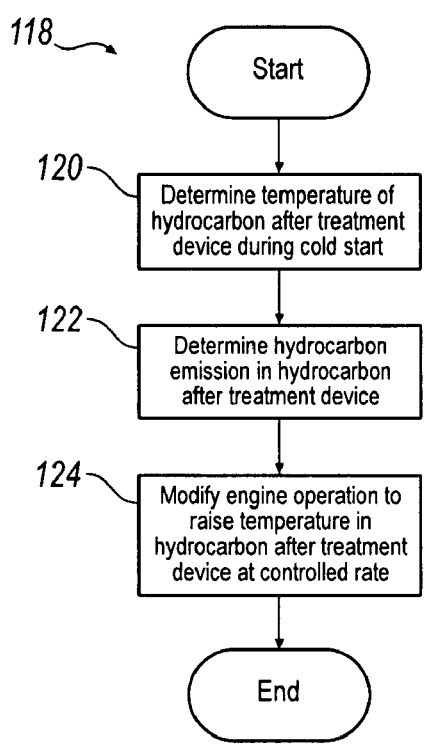
FIG. 2 is a schematic representation of one method of operating an engine according to the present invention.

Turning to FIG. 2, there is represented a schematic flow chart of one method of the present invention.

Specifically, method 118 begins at step 120, determining the temperature of the after-treatment device during cold start conditions. This may be accomplished through the use of sensors attached to the after treatment device and electronically connected to the electronic control module ECM to transmit temperature data from the after treatment device to the ECM. Within the ECM are tables loaded with temperature ranges for the after treatment device to permit the engine to determine the best mode of operation for each temperature range sensed from the after treatment device. Once the ECM had detected a cold hydrocarbon after treatment device, step 122 is determining hydrocarbon emissions in the after treatment device. This may be accomplished by sensors in the hydrocarbon after treatment device in contact with an exhaust stream to measure the amount or concentration of hydrocarbons in the exhaust stream during cold start conditions. It is known that cold start conditions produce excess hydrocarbon emissions that are trapped in the hydrocarbon after-treatment device. As the engine warms up, the exhaust gas temperature rises and uncontrolled oxidation of the trapped hydrocarbons can occur in the hydrocarbon after-treatment device, resulting in damage to the after treatment device. Step 124 is modifying the engine operation to raise the hydrocarbon after treatment device temperature at a pre-determined rate to a temperature sufficient to permit a controlled oxidation of the hydrocarbons in the after treatment device. Once the hydrocarbon after treatment device has reach optimum operating temperature, engine operation is returned to normal.

The engine operation during cold start conditions may be modified by controlling at least one of engine speed, fuel injection timing, fuel injection pressure, exhaust gas recirculation, air intake throttle, exhaust throttle, turbocharger operation, valve timing, intake air heater and engine raking to raise the exhaust temperature at a controlled rate to oxidize hydrocarbons in the hydrocarbon after treatment device during cold engine start conditions in a controlled manner.

Figure 3:
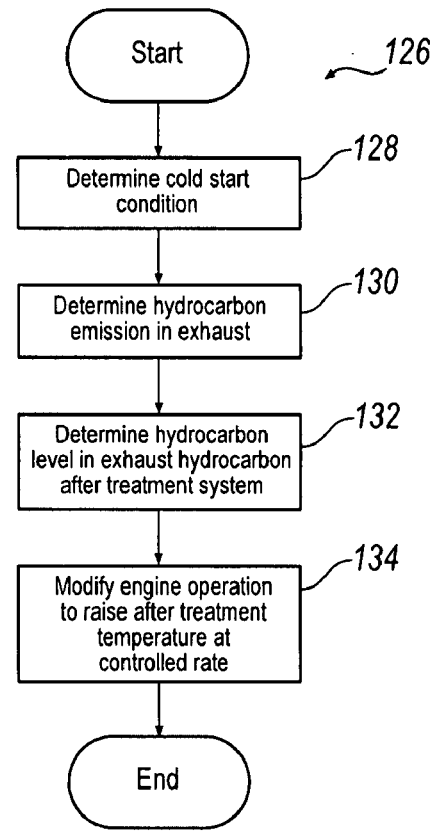
FIG. 3 is a schematic representation of another method of operating an engine according to the present invention.

FIG. 3 is another method of controlling engine operation according to the disclosed invention. Specifically, method 126 begins with step 128, determining the cold start temperature. This may be accomplished by sensing at least one of the ambient air temperature, the radiator fluid temperature, oil temperature, engine temperature, engine starting time, engine speed, fuel delivery, and valve timing or in any other manner to determine whether the engine is in a cold start condition. By cold start conditions as set forth in the embodiments of this invention, it is meant that the engine is stating in an ambient temperature of less than about 20° F. Step 130 is determining the hydrocarbon emission level in an engine exhaust stream during cold start conditions. This may be accomplished by sensors in the exhaust system that are electronically attached to the ECM to provide data signals indicative of hydrocarbons in the exhaust stream. The ECM may contain tables with hydrocarbon levels load therein to assist the ECM in determining how to respond to various levels of sensed hydrocarbons in the exhaust stream. Step 132 is determining the hydrocarbon level in the hydrocarbon after-treatment device. Again, this may be accomplished by sensors attached to the hydrocarbon after treatment device and electronically connected to the ECM to transmit data signals indicative of sensed levels of hydrocarbons in the after treatment device. Step 134 is modifying the engine operation conditions during the cold start to raise the temperature of the after treatment device at a pre-determined rate to a temperature sufficient to permit a controlled oxidation of the hydrocarbons in the hydrocarbon after treatment device. This is accomplished by the ECM modifying engine operations by controlling at least one of engine speed, fuel delivery, fuel injection pressure, exhaust gas recirculation, air intake throttle, exhaust throttle, turbocharger operation (variable geometry, wastegate, sequential or staged turbocharger), valve timing intake air heater and engine raking to raise the exhaust temperature at a controlled rate to oxidize hydrocarbons in the after treatment device during cold start conditions.

After the exhaust temperature has raised the hydrocarbon after treatment device sufficiently to oxidize the excess hydrocarbons in a controlled manner, engine operation is returned to normal operation once it is determined that the excess hydrocarbons have been oxidized from the hydrocarbon after treatment device.

It is apparent to those skilled in the art that the words used to describe the invention are words of description, and not words of limitation. Many modifications and variations will become apparent to those skilled in the art without departing fro the scope and sprit of the invention as et forth in the appended claims.

What is claimed as new and desired to be protected by Letters Patent of the United States is:

1. A method to control temperature of hydrocarbons in a Diesel Particulate Filter (DPF) for an electronic control heavy duty compression ignition engine having an Electronic Control Module (ECM) during cold start conditions comprising:
   a) determining the temperature in the DPF during cold start conditions;
   b) determining hydrocarbon emissions in said DPF; and
   c) modifying engine operating conditions to raise the temperature in the DPF at a pre-determined rate to a temperature sufficient to permit controlled oxidation of said hydrocarbons in said DPF.

2. The method of claim 1, further including returning said engine operation to normal engine operation when said hydrocarbon level in said DPF is reduced to a safe engine operating level.

3. The method of claim 1, wherein said cold start condition is detected by measuring engine starting time, engine temperature, engine speed, fuel delivery, valve timing, or radiator fluid temperature.

4. The method of claim 1, wherein the ECM modifies engine operation by controlling at least one of engine speed, fuel injection timing, fuel injection pressure, exhaust gas recirculation, air intake throttle, exhaust throttle, turbocharger operation, valve timing, intake air heater and engine raking to raise exhaust temperature at a controlled rate to oxidize hydrocarbons in said DPF during cold start conditions.

5. The method of claim 4, wherein said turbocharger is a Variable Geometry Turbocharger (VGT), a wastegate turbo charger, a sequential turbo charger, or a staged turbo charger.

6. A method to cold start an electronic controlled heavy duty compression ignition engine having an ECM and an exhaust aftertreatment system to control oxidation of hydrocarbons in said exhaust aftertreatment system, comprising:
   a) determining engine cold start condition;
   b) determining hydrocarbon emissions in engine exhaust stream during engine cold start based upon at least one signal indicative of sensed levels of hydrocarbons in the aftertreatment system received from at least one sensor in the aftertreatment system;
   c) determining hydrocarbon level in the exhaust hydrocarbon aftertreatment system; and
   d) modifying engine operation conditions during cold start to raise a temperature in the aftertreatment system at a pre-determined rate to a temperature sufficient to permit controlled oxidation of said hydrocarbons in the aftertreatment system.

7. The method of claim 6, wherein said hydrocarbon aftertreatment system is a diesel particulate filter (DPF).

8. The method of claim 6, further including returning said engine operation to normal engine operation when said hydrocarbon level in said aftertreatment system is reduced to a safe engine operating level.

9. The method of claim 6, wherein said cold start condition is detected by measuring engine starting time, engine temperature, engine speed, fuel delivery, valve timing, or radiator fluid temperature.

10. The method of claim 6, wherein the ECM modifies engine operation by controlling at least one of engine speed, fuel injection timing, fuel injection pressure, exhaust gas recirculation, air intake throttle, exhaust throttle, turbocharger operation, valve timing, intake air heater and engine raking to raise exhaust temperature at a controlled rate to oxidize hydrocarbons in said aftertreatment system during cold start conditions.

11. The method of claim 10, wherein said turbocharger is a Variable Geometry Turbocharger (VGT), a wastegate turbo charger, a sequential turbo charger, or a staged turbo charger.

* * * * *